US006045920A

United States Patent [19]

Ou-Yang et al.

[11] Patent Number: 6,045,920

[45] Date of Patent: Apr. 4, 2000

[54] IMAGING MEDIUM, METHOD OF IMAGING SAID MEDIUM, AND IMAGE-BEARING MEDIUM

[75] Inventors: David T. Ou-Yang, Woodbury; Robert C. Fitzer, North Oaks, both of Minn.

[73] Assignee: 3M Innovative Properties Company, St. Paul, Minn.

[21] Appl. No.: 08/995,767

[22] Filed: Dec. 22, 1997

Related U.S. Application Data

[62] Division of application No. 08/615,010, Mar. 12, 1996, Pat. No. 5,728,502.

[51] Int. Cl.$^{7}$ .......................... B32B 26/06; B32B 27/32; B32B 27/36

[52] U.S. Cl. .......................... 428/483; 428/500; 428/522; 428/523; 430/126; 427/521

[58] Field of Search .................................. 428/483, 500, 428/195, 522, 523; 427/521, 358; 430/126

[56] References Cited

U.S. PATENT DOCUMENTS

| | | | |
|---|---|---|---|
| Re. 24,906 | 12/1960 | Ulrich | 206/59 |
| 3,188,265 | 6/1965 | Charbonneau et al. | 161/188 |
| 3,188,266 | 6/1965 | Charbonneau et al. | 161/188 |
| 3,389,827 | 6/1968 | Abere et al. | 220/53 |
| 3,445,546 | 5/1969 | Pledger, Jr. | 260/897 |
| 3,869,422 | 3/1975 | Dawes et al. | 260/42.47 |
| 3,937,854 | 2/1976 | Shank, Jr. | 427/29 |
| 3,955,020 | 5/1976 | Cavanagh et al. | 428/35 |
| 4,075,363 | 2/1978 | Shank, Jr. | 427/27 |
| 4,080,348 | 3/1978 | Korpman | 260/27 |
| 4,121,956 | 10/1978 | Sample | 156/80 |
| 4,136,071 | 1/1979 | Korpman | 260/27 |
| 4,161,562 | 7/1979 | Yoshikawa et al. | 428/215 |
| 4,181,752 | 1/1980 | Martens et al. | 427/54.1 |
| 4,247,563 | 1/1981 | Sample | 426/87 |
| 4,279,344 | 7/1981 | Holloway, Jr. | 260/631 |
| 4,286,039 | 8/1981 | Landa et al. | 430/119 |
| 4,653,752 | 3/1987 | Miller | 273/60 |
| 4,684,238 | 8/1987 | Till et al. | 355/10 |

(List continued on next page.)

FOREIGN PATENT DOCUMENTS

| | | |
|---|---|---|
| 0046026 | 2/1982 | European Pat. Off. . |
| 0 468 604 B1 | 1/1992 | European Pat. Off. . |
| 0 472 629 B1 | 9/1993 | European Pat. Off. . |

OTHER PUBLICATIONS

Product Brochure entitled, “DuPont® Surlyn® 1705–1,” Wilmington, Delaware, Jan. 1994 Product.

Product Brochure entitled, “DuPont® Brynel CXA Series 2000,” Wilmington, Delaware.

Product Brochure entitled, “DuPont® Surlyn ® Property Grid,” Wilmington, Delaware.

Standard Test Method for Flow Rates of Thermoplastics by Extrusion Plastometer, *ASTM*, D 1238—94a.

Brooks et al., “Processing of Surlyn® Ionomer Resins by Blown and Cast Film Processes,” Surlyn® Technical Letter–Technical Services Laboratory, No. 70–4.

*Primary Examiner*—D. S. Nakarani
*Assistant Examiner*—Ramsey Zacharia
*Attorney, Agent, or Firm*—James J. Trussell

[57] ABSTRACT

A polymeric imaging medium comprising a receptor layer and an optional backing layer particularly useful in electrophotographic printing processes with liquid toners comprising thermoplastic toner particles in a liquid carrier that is not a solvent for the particles at a first temperature and that is a solvent for the particles at a second temperature, methods of imaging such a medium, and such an imaged medium. In one preferred embodiment, the receptor layer comprises a polymer of ethylene, n-butylacrylate, and methacrylic acid. In another preferred embodiment, the receptor layer comprises a blend of 60 to 90 percent by weight of a polymer comprising ethylene, n-butylacrylate, and methacrylic acid and about 10 to 40 percent by weight of a neutralized ethylene-methacrylic acid copolymer.

12 Claims, 3 Drawing Sheets

U.S. PATENT DOCUMENTS

| | | | |
|---|---|---|---|
| 4,767,654 | 8/1988 | Riggsbee | 428/40 |
| 4,792,584 | 12/1988 | Shiraki et al. | 524/77 |
| 4,794,651 | 12/1988 | Landa et al. | 430/110 |
| 4,833,179 | 5/1989 | Young et al. | 522/183 |
| 4,835,025 | 5/1989 | Thompson et al. | 428/34.2 |
| 4,842,974 | 6/1989 | Landa et al. | 430/137 |
| 4,900,604 | 2/1990 | Martinez et al. | 428/79 |
| 4,916,025 | 4/1990 | Lu | 428/516 |
| 4,952,650 | 8/1990 | Young et al. | 526/194 |
| 4,974,027 | 11/1990 | Landa et al. | 355/256 |
| 4,983,436 | 1/1991 | Bailey et al. | 428/40 |
| 4,984,025 | 1/1991 | Landa et al. | 355/256 |
| 4,999,677 | 3/1991 | Landa et al. | 355/273 |
| 5,028,964 | 7/1991 | Landa et al. | 355/273 |
| 5,047,306 | 9/1991 | Almog | 430/115 |
| 5,047,808 | 9/1991 | Landa et al. | 355/277 |
| 5,089,856 | 2/1992 | Landa et al. | 355/279 |
| 5,108,865 | 4/1992 | Zwaldo | 430/126 |
| 5,117,263 | 5/1992 | Adam et al. | 355/256 |
| 5,148,222 | 9/1992 | Lior et al. | 355/256 |
| 5,192,638 | 3/1993 | Landa et al. | 430/137 |
| 5,196,246 | 3/1993 | Kauss et al. | 428/39 |
| 5,198,301 | 3/1993 | Hager et al. | 428/355 |
| 5,242,888 | 9/1993 | Atherton et al. | 503/227 |
| 5,276,492 | 1/1994 | Landa et al. | 355/277 |
| 5,286,593 | 2/1994 | Landa et al. | 430/115 |
| 5,300,390 | 4/1994 | Landa et al. | 430/115 |
| 5,302,431 | 4/1994 | Schultz | 428/35.7 |
| 5,335,054 | 8/1994 | Landa et al. | 355/279 |
| 5,380,611 | 1/1995 | Landa | 430/43 |
| 5,410,392 | 4/1995 | Landa | 355/271 |
| 5,436,706 | 7/1995 | Landa et al. | 355/256 |
| 5,494,745 | 2/1996 | Vander Velden et al. | 428/354 |
| 5,834,397 | 11/1998 | Yamazaki et al. | 503/227 |
| 5,849,419 | 12/1998 | Josephy et al. | 428/516 |
| 5,858,516 | 1/1999 | Ou-Yang | 428/195 |
| 5,858,552 | 1/1999 | Bader et al. | 428/516 |

IMAGING MEDIUM, METHOD OF IMAGING SAID MEDIUM, AND IMAGE-BEARING MEDIUM

This is a division of application Ser. No. 08/615,010 filed Mar. 12, 1996 now U.S. Pat. No. 5,728,502,

TECHNICAL FIELD

The present invention relates generally to an imaging medium. The present invention relates more particularly an imaging medium comprising a receptor layer and an optional backing layer particularly useful in electrophotographic printing processes with liquid toners comprising thermoplastic toner particles in a liquid carrier that is not a solvent for the particles at a first temperature and that is a solvent for the particles at a second temperature; methods of imaging such a medium; and such an imaged medium.

BACKGROUND OF THE INVENTION

Methods and apparatuses for electrophotographic printing are known. Electrophotographic printing generally includes imparting an image on a final receptor by forming a latent image on selectively charged areas of a photoconducter such as a charged drum, depositing a charged toner onto the charged areas of the photoconductor to thereby develop an image on the photoconductor, and transferring the developed toner from the charged drum under heat and/or pressure onto the final receptor. An optional transfer member can be located between the photoconductor and the final receptor. Examples of electrophotgraphic apparatuses and methods are disclosed in U.S. Pat. Nos. 5,276,492; 5,380,611; and 5,410,392. The '492 and '392 patents both disclose that a preferred toner is a liquid toner comprising carrier liquid and pigmented polymeric toner particles which are essentially non-soluble in the carrier liquid at room temperature, and which solvate in the carrier liquid at elevated temperatures. Examples of such liquid toners are disclosed in U.S. Pat. No. 4,794,651. The '492 patent and the '392 patent both disclose that the toner image can be transferred to a receiving substrate such as paper ('492 patent: column 7, lines 19–20; '392 patent: column 4, lines 57–58). While having their own utility, paper substrates are not desired for all applications and uses. The '611 patent discloses that the toner image can be transferred to a receiving such as a transparency, without disclosing any particular composition of a transparency (column 4, lines 17).

It is also known that certain polymeric and ionomeric compositions are suitable for use with some printing methods and apparatuses. For example, flexographic printing on films made from SURLYN brand ionomeric resin, available from E.I. du Pont de Nemours & Company, Wilmington, Del. has been suggested. See Brooks & Pirog, *Processing of Surlyn® Ionomer Resins by Blown and Cast Film Processes*, p. 18, Du Pont Company, Plastics Department, Polyolefins Division, Technical Services Laboratory. U.S. Pat. No. 5,196,246 discloses a wall decorating system that, in one embodiment, includes a SURLYN blend film that can be printed by etching, embossing, flexographic printing, silk screening, or gravure processes (column 14, lines 16–19).

What is desired is an imaging medium that can be printed by electrophotographic methods and apparatuses to produce high quality images and that is strong, durable, and abrasion-resistant.

SUMMARY OF THE INVENTION

The present invention provides imaging media comprising a receptor layer and an optional backing layer. The imaging media of the present invention are particularly useful in electrophotographic printing processes with liquid toners comprising thermoplastic toner particles in a liquid carrier that is not a solvent for the particles at a first temperature and that is a solvent for the particles at a second temperature. The present invention also provides methods of imaging such imaging media, and such an imaged media.

One aspect of the present invention presents an imaging medium comprising a receptor layer and a backing layer bonded to the backing layer by extruding the receptor layer onto the backing layer and irradiating the receptor layer and backing layer with ultraviolet radiation while being heated to at least 180° F. In one preferred embodiment, the backing layer comprises polyester.

In one aspect of the above imaging medium, the receptor layer comprises a polymer of ethylene vinyl acetate, having a melt point index of at least 2.5 grams/10 minutes and a vinyl acetate content of from 15 to 35% by weight. In a preferred embodiment, this polymer may further comprise methacrylic acid in an amount of at least 1.0% by weight. In another preferred embodiment, this polymer may further comprise an anhydride in an amount of at least 0.1% by weight.

In another aspect of the above imaging medium, the receptor layer comprises a polymer of ethylene acrylate, having a melt point index of at least 2.5 grams/10 minutes and an acrylate content of from 10 to 30% by weight. In a preferred embodiment, this polymer may further comprise methacrylic acid in an amount of at least 3.0% by weight. In another preferred embodiment, this polymer may further comprise an anhydride in an amount of at least 0.1% by weight.

In another aspect of the above imaging medium, the receptor layer comprises a polymer of ethylene and an acid selected from methacrylic acid and carboxylic acid, having a melt point index of at least 2.5 grams/10 minutes and an acid content of from 8 to 20% by weight. In a variation on this embodiment, the ethylene acid is neutralized with a metal cation thereby forming an ionomer, having a neutralized acid content of from 2 to 6% by weight and an acid content of no more than 15% by weight. In a preferred embodiment, the ionomer comprises a neutralized ethylene-co-methacrylic acid ionomer.

In another aspect, the present invention presents an imaging medium comprising a receptor layer comprising a first polymer of ethylene, n-butylacrylate, and methacrylic acid having a melt point index of at least 2.5 grams/10 minutes; and a polyester backing layer bonded to the backing layer by extruding the receptor layer onto the backing layer and irradiating the receptor layer and backing layer with ultraviolet radiation while being heated to at least 180° F. In one preferred embodiment, the receptor layer, further comprising a second polymer comprising a neutralized ethylene-co-methacrylic acid ionomer. The receptor layer preferably comprises a blend of the first polymer in an amount of from 60 to 90% by weight and the second polymer in an amount of from 10 to 30% by weight.

The present invention also provided a method of transferring an electrophotographically developed image from a photoconductor to an imaging medium. The method comprises the steps of: a) selectively providing desired portions of a photoconductor with a developed image, the image comprising a plurality of thermoplastic toner particles in a liquid carrier at a first temperature, wherein the liquid carrier is not a solvent for the particles at the first temperature and wherein the thermoplastic particles and the liquid carrier form substantially a single phase at or above a second temperature; b) heating the developed image to a temperature at least as high as the second temperature to thereby form a single phase of the thermoplastic particles and liquid carrier; and c) thereafter transferring the developed image to the receptor layer of an imaging medium. In one preferred embodiment the receptor layer is bonded to a backing layer. Preferably, the receptor layer is bonded to the backing layer by extruding the receptor layer onto the backing layer, and wherein the extruded receptor layer and backing layer have been irradiated with ultraviolet radiation while being heated to at least 180° F.

In one preferred embodiment of the above method, the receptor layer comprises a polymer of ethylene vinyl acetate, having a melt point index of at least 2.5 grams/10 minutes and a vinyl acetate content of from 15 to 35% by weight. In one preferred embodiment, the polymer further comprises methacrylic acid in an amount of at least 1.0% by weight. In another preferred embodiment, the polymer further comprises an anhydride in an amount of at least 0.1% by weight.

In another preferred embodiment of the above method, the receptor layer comprises a polymer of ethylene acrylate, having a melt point index of at least 2.5 grams/10 minutes and an acrylate content of from 10 to 30% by weight. In one preferred embodiment, the polymer further comprises methacrylic acid in an amount of at least 3.0% by weight. In another preferred embodiment, the polymer further comprises an anhydride in an amount of at least 0.1% by weight.

In another preferred embodiment of the above method, the receptor layer comprises a polymer of ethylene and an acid selected from methacrylic acid and carboxylic acid, having a melt point index of at least 2.5 grams/10 minutes and an acid content of from 8 to 20% by weight. In one preferred embodiment, the ethylene acid has been neutralized with a metal cation thereby forming an ionomer, having a neutralized acid content of from 2 to 6% by weight and an acid content of no more than 15% by weight. In another preferred embodiment, the ionomer comprises a neutralized ethylene-co-methacrylic acid ionomer.

Another aspect of the present invention presents a further method of transferring an electrophotographically developed image from a photoconductor to an imaging medium. The method comprises the steps of: a) selectively providing desired portions of a photoconductor with a developed image, the image comprising a plurality of thermoplastic toner particles in a liquid carrier at a first temperature, wherein the liquid carrier is not a solvent for the particles at the first temperature and wherein the thermoplastic particles and the liquid carrier form substantially a single phase at or above a second temperature; b) heating the developed image to a temperature at least as high as the second temperature to thereby form a single phase of the thermoplastic particles and liquid carrier; and c) thereafter transferring the developed image to the receptor layer of an imaging medium; wherein the receptor layer comprises a first polymer of ethylene, n-butylacrylate, and methacrylic acid having a melt point index of at least 2.5 grams/10 minutes; and wherein the imaging medium further comprises a polyester backing layer bonded to the backing layer by extruding the receptor layer onto the backing layer and irradiating the receptor layer and backing layer with ultraviolet radiation while being heated to at least 180° F. In one preferred embodiment of the method, the receptor layer further comprises a second polymer comprising a neutralized ethylene-co-methacrylic acid ionomer. In another preferred embodiment of the method, the receptor layer comprises a blend of the first polymer in an amount of from 60 to 90% by weight and the second polymer in an amount of from 10 to 30% by weight.

The present invention also provides an imaged article. The imaged article comprises a receptor layer having an imaging surface and an image on the imaging surface, the image comprising a substantially continuous layer, the layer comprising the thermoplastic and a liquid carrier that is not a solvent for the particles at a first temperature and which is a solvent for the particles at or above a second temperature, the layer having been deposited onto the imaging surface while in substantially a single phase with a liquid carrier. In one preferred embodiment, the receptor layer is bonded to a backing layer. In another preferred embodiment, the receptor layer is bonded to the backing layer by extruding the receptor layer onto the backing layer, and wherein the extruded receptor layer and backing layer have been irradiated with ultraviolet radiation while being heated to at least 180° F.

In one preferred embodiment of the above imaged article, the receptor layer comprises a polymer of ethylene vinyl acetate, having a melt point index of at least 2.5 grams/10 minutes and a vinyl acetate content of from 15 to 35% by weight. In another preferred embodiment, the polymer further comprises methacrylic acid in an amount of at least 1.0% by weight. In another preferred embodiment, the polymer further comprises an anhydride in an amount of at least 0.1% by weight.

In another preferred embodiment of the above imaged article, the receptor layer comprises a polymer of ethylene acrylate, having a melt point index of at least 2.5 grams/10 minutes and an acrylate content of from 10 to 30% by weight. In one preferred embodiment, the polymer further comprises methacrylic acid in an amount of at least 3.0% by weight. In another preferred embodiment, the polymer further comprises an anhydride in an amount of at least 0.1% by weight.

In another preferred embodiment of the imaged article, receptor layer comprises a polymer of ethylene and an acid selected from methacrylic acid and carboxylic acid, having a melt point index of at least 2.5 grams/10 minutes and an acid content of from 8 to 20% by weight. In another preferred embodiment, the ethylene acid has been neutralized with a metal cation thereby forming an ionomer, having a neutralized acid content of from 2 to 6% by weight and an acid content of no more than 15% by weight. In another preferred embodiment the ionomer comprises a neutralized ethylene-co-methacrylic acid ionomer.

The present invention also presents a further imaged article, comprising: a receptor layer having an imaging surface, wherein the receptor layer comprises a first polymer of ethylene, n-butylacrylate, and methacrylic acid having a melt point index of at least 2.5 grams/10 minutes; a polyester backing layer bonded to the backing layer by extruding the receptor layer onto the backing layer and irradiating the receptor layer and backing layer with ultraviolet radiation while being heated to at least 180° F.; and an image on the imaging surface, the image comprising a substantially continuous layer, the layer comprising the thermoplastic and a liquid carrier that is not a solvent for the particles at a first temperature and which is a solvent for the particles at or above a second temperature, the layer having been deposited onto the imaging surface while in substantially a single phase with a liquid carrier. In one preferred embodiment, the receptor layer further comprises a second polymer comprising a neutralized ethylene-co-methacrylic acid ionomer. In another preferred embodiment the receptor layer comprises a blend of the first polymer in an amount of from 60 to 90% by weight and the second polymer in an amount of from 10 to 30% by weight.

Certain terms are used in the description and the claims that, while for the most part are well known, may require some explanation. It should be understood that the term "electrophotographic printing" refers to printing processes in which an image is imparted on a receptor by forming a latent image on selectively charged areas of a photoconducter such as a charged drum, depositing a charged toner onto the charged areas of the photoconductor to thereby develop an image on the photoconductor, and transferring the developed toner from the charged drum under heat and/or pressure onto an imaging medium. An optional transfer member can be located between the charged drum and the imaging medium. Examples of electrophotographic printing apparatuses are well known in the art and include, but are not limited to, the OMNIUS and E-1000 electrophotographic printers, available from Indigo, Ltd. of Rehovot, Israel; the DCP-1 printer available from Xeikon N.V. of Mortsel, Belgium; and the LANIER 6345 copier available from Lanier Worldwide, Inc. of Atlanta, Ga.

BRIEF DESCRIPTION OF THE DRAWINGS

The present invention will be further explained with reference to the appended Figures, wherein like structure is referred to by like numerals throughout the several views, and wherein.

DETAILED DESCRIPTION OF THE INVENTION

The present invention provides imaging media comprising a receptor layer and an optional backing layer. The imaging media of the present invention are particularly useful in electrophotographic printing processes with liquid toners comprising thermoplastic toner particles in a liquid carrier that is not a solvent for the particles at a first temperature and that is a solvent for the particles at a second temperature. The present invention also provides methods of imaging such imaging media, and such an imaged media.

Imaging Medium

Figure 1:
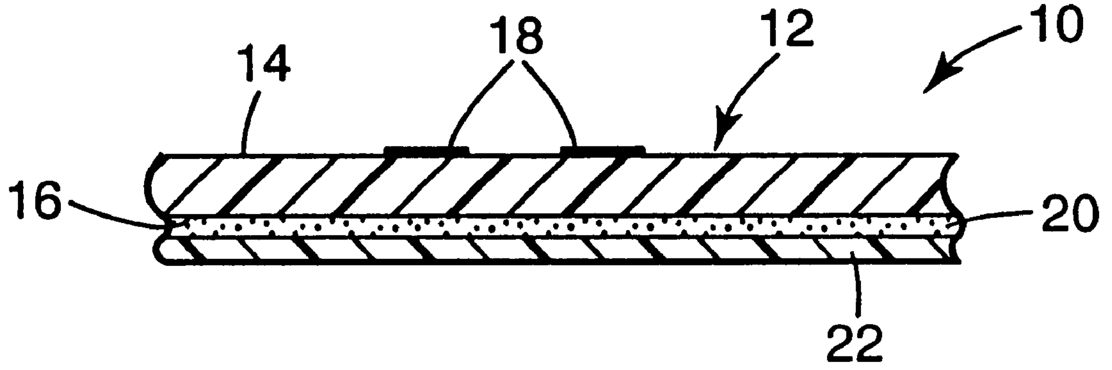
FIG. 1 is a cross-sectional view of a first embodiment of an imaging medium according to the present invention.

Referring now to FIG. 1, there is illustrated a first preferred embodiment of the imaging medium 10. Imaging medium 10 includes receptor layer 12 having first major surface, or imaging surface, 14, and second major surface, or back surface, 16. Also illustrated in FIG. 1 is optional layer of adhesive 20. When adhesive 20 is a pressure sensitive adhesive, then optional release liner 22 is preferably provided on the exposed surface of the adhesive layer 20 as is well known in the art. As shown in FIG. 1, image 18 has been printed on imaging surface 14 as is discussed in detail below.

Figure 2:
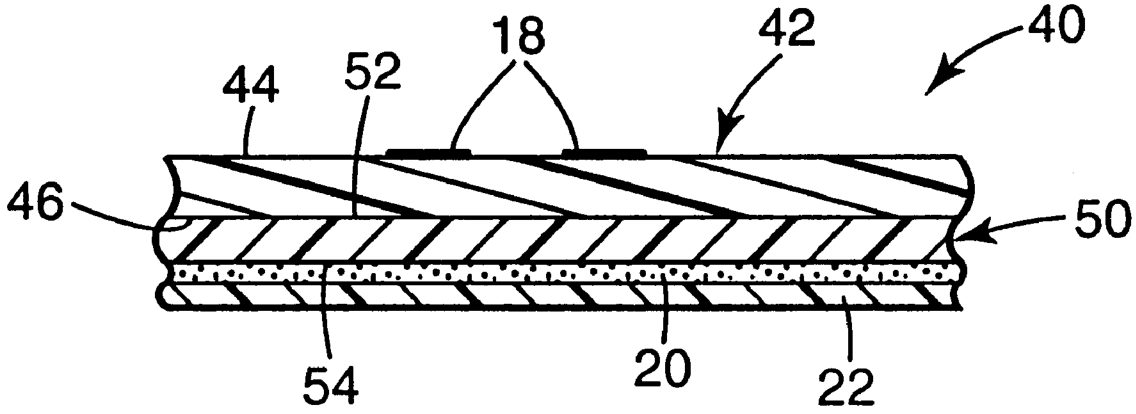
FIG. 2 is a cross-sectional view of a second embodiment of an imaging medium according to the present invention.

Referring now to FIG. 2, there is illustrated a second preferred embodiment of imaging medium 40. This embodiment includes receptor layer 42 joined to backing layer 50. Receptor layer 42 includes first major surface, or image surface 44, and second major surface, or back surface 46. Backing layer 50 includes first major surface 52 joined to the second surface 46 of the receptor layer. Backing layer also includes second major surface 54 opposite the first major surface 52. Optional layer of adhesive 20 may be provided on the second major surface 54 of the backing layer. As above, when the adhesive layer is a pressure sensitive adhesive, then it is preferable to provide release liner 22 as is well known in the art. As shown in FIG. 2, image 18 has been printed on imaging surface 44 as is discussed in detail below.

The receptor layer 12, 42 preferably comprises a polymer obtained by polymerizing ethylene with vinyl acetate, (meth)acrylic acid, or esters of (meth)acrylic acid. Optionally, these polymers may be modified by the addition of anhydrides (e.g., maleic anhydride) or acid (e.g., methacrylic acid). Optionally, those polymers modified with acid may be partially neutralized by the addition of a metal cation, thus forming ionomers. Alternatively, blends of polymers may be formed by mixing together two or more of the above polymers. Additionally, one or more of these polymers or blends may be further blended with low density polyethylene (LDPE) or linear low density polyethylene (LLDPE). LLDPE's are commonly made by low pressure polymerization carried out at pressures in the range of about 7 to 20 bar in the gas phase in a fluid bed reactor or in the liquid phase. In low pressure polymerization, ethylene units polymerize in a linear fashion, whereby short branches or side chains can be built into the structure at intervals by copolymerizing with small amounts of α-olefins such as propylene, butene, octene, or hexene. The density of the polymer is controlled by the frequency of the side chains.

Receptor layer materials useful in the present invention preferably have a melt index of at least about 2.5 grams/10 minutes, preferably ranging from about 3.0 to 45 grams/10 minutes. Melt flow index is determined by following the procedures set forth in ASTM Standard "D-1238", "Standard Test Method for Flow Rates of Thermoplastics by Extrusion Plastometer" at 190° C.; 2.16 kg. Percent compositions set forth herein are percent by weight, unless otherwise specified.

In one preferred embodiment, the receptor layer 12, 42 comprises an ethylene vinyl acetate ("EVA") co- or terpolymer. Preferably, the EVA has a vinyl acetate content of at least 10% by weight, preferably about 15% to 35% by weight, and more preferably about 18% by weight. One example of a preferred EVA copolymer is ELVAX 3175 commercially available from E.I. du Pont de Nemours & Company, Wilmington, Del. ("du Pont") and has a melt index of approximately 6.0 grams/10 minutes and a vinyl acetate content of about 28%. If the receptor comprises an EVA modified with acid, for example methacrylic acid, it preferably comprises at least 1.0% acid. One example of such a terpolymer is ELVAX 4260 commercially available from du Pont which has a melt index of approximately 6.0 grams/10 minutes, a vinyl acetate content of approximately 28%, and a methacrylic acid content of approximately 1.0%. If the receptor comprises an EVA modified with anhydride, it preferably comprises at least 0.1% anhydride, such as maleic anhydride. One example of such a terpolymer is "MODIC E-300-K" available commercially from Mitsubishi Petroleum Co., Ltd. of Japan. Polymers having a vinyl acetate content below about 15% by weight tend to have poor printability characteristics; and polymers having a vinyl acetate content above about 30% by weight tend to be sticky and impractical to use in the extrusion and printing processes.

In another preferred embodiment, the receptor layer 12, 42 comprises an ethylene acrylate co- or terpolymer, the acrylate comprising, for example, (meth)acrylate (e.g., ethyl (meth)acrylate, n-butyl(meth)acrylate, etc.). If the receptor comprises an ethylene acrylate terpolymer having acid, for example methacrylic acid, it comprises at least 3.0% acid. If the receptor comprises an ethylene acetate anhydride terpolymer, it preferably comprises at least 0.1% anhydride, such as maleic anhydride. The acrylate content is preferably 10–30%. One example of such a terpolymer is "BYNEL CXA 2002" from du Pont, a terpolymer comprising ethylene, n-butylacrylate, and methacrylic acid (EAMA) having a melt index of approximately 10.0 grams/10 minutes, a methacrylic acid content of about 10%, and an n-butylacrylate content of about 10%.

In another preferred embodiment, the receptor layer 12, 42 comprises an ethylene, acid copolymer, the acid preferably comprising methacrylic acid or carboxylic acid in an amount of about 8.0 to 20% by weight. Polymers having a lower acid content may not have sufficient abrasion resistance. Polymers having a higher acid content may damaging processing equipment over extended periods of time. An example of such an ethylene, acid copolymer is NUCREL 1207 available from du Pont, having a melt index of about 7.0 and a methacrylic acid of about 12.0%.

In another preferred embodiment, the receptor layer 12, 42 comprises an ethylene acid copolymer that has been partially neutralized with a metal cation, thereby forming an ionomer. The salt content is preferably be greater than about 1% by weight, and preferably ranges from about 2 to about 6% by weight, with preferably no more than 15% leftover acid. Preferred examples of ionomers include copolymers of ethylene with acrylic acid or methacrylic acid, neutralized with a metal cation such as zinc, sodium, potassium, or magnesium. Particularly preferred ionomeric polymers are copolymers of ethylene with methacrylic acid. E.I. Du Pont de Nemours Co. produces a line of neutralized ethylene-co-methacrylic acid ionomeric polymers under the trade designation "SURLYN" that are acceptable for the present use, provide that the selected resin has the requisite melt flow index. A particularly preferred ionomeric resin is commercially available under the trade designation "SURLYN 1705-1", which has a melt point index of 5.5 grams/10 minutes which is neutralized with zinc cation, is about 3% acid neutralized, and has about 12% acid content.

In one preferred embodiment, the receptor layer 12, 42 comprises a blend of any one of the above polymers in an amount of 60 to 90% with any other of the polymers in an amount of 10 to 40%. In yet another preferred embodiment, the receptor layer comprises a blend of any one of the above polymers with up to about 40% LDPE or LLDPE. In one particularly preferred embodiment, the receptor layer 12, 42 comprises a blend of polymers ranging in composition from about 60–90% by weight EAMA, such as "BYNEL CXA 2002" and about 10–40% by weight of a neutralized ethylene-methacrylic acid copolymer, such as "SURLYN 1705-1" from du Pont. More preferably, such a blend comprises about 70–85% by weight EAMA ("BYNEL CXA 2002") and about 15–30% by weight ionomer ("SURLYN 1705-1").

The thickness of the receptor layer 12, 42 is not necessarily critical, but it preferably from about 0.00027 to 0.0254 cm (0.0001 to 0.010 inches), more preferably from about 0.7 mil 0.0013 to 0.008 cm (0.0005 to 0.003 inches). The desired thickness is determined by the intended use of the film and desired characteristics affecting handling and cutting. To produce the receptor layer 12, 42 of this invention, pellets or powder of resin along with optional resins or additives, as obtained from the manufacturer, are mixed together, melted, and extruded to form a film. Optionally, the film can be extruded onto the backing layer 50 as described in detail below.

Useful materials for the backing layer 50 include, but are not limited to, polyester, polyamide, polyvinylchloride (PVC), polyimide, polycarbonate, and polypropylene. The backing layer 50 may be transparent, colorless, pigmented, or metallized. Opaque, white backing layers are useful for this invention and typically are achieved by the addition to the polymer of conventional pigmenting agents such as titania, calcium carbonate, and talc. Metallized backing layers are also useful and typically are prepared by vapor coating aluminum onto the polymer. Such pigmented or metallized backing layers are particularly preferred when the receptor layer is transparent, or nearly so. In such a construction, the backing layer when bonded to the receptor layer provides an opaque imaging medium which is desirable for many print applications. Such a construction also makes it unnecessary to add pigmenting additives to the receptor layer itself Such additives may adversely affect the durability of the printed image on the receptor layer. It is also within the scope of the invention to use a transparent imaging medium. The thickness of the backing layer is preferably from about 0.00025 to 0.025 cm (0.0001 to 0.01 inches), and more preferably about 0.013 to 0.13 cm (0.0005 to 0.005 inches). When an opaque backing is desired it preferably has an optical density of 2.5+/−10% as measured on a MacBeth TD927 densitometer, available from Macbeth of Newburgh, N.Y.

The receptor layer 50 can be joined to the backing layer 42 by a number of techniques. Suitable joining means include pressure sensitive adhesives, heat activated adhesives, sonic welding, and the like. In one preferred embodiment of imaging medium 40, the receptor layer 42 is extruded to the backing layer 50 to form a composite structure. The material of the receptor layer 42 is coated onto the backing layer 50 in a molten state by a conventional extrusion process. The temperature of the material of the receptor layer, when in the extruder, typically ranges from about 250° F. (121° C.) to about 480° F. (249° C.). The temperature of the material of the receptor layer 50 as it exits the extruder is typically from about 350° F. (177° C.) to about 560° F. (293° C.). After the material of the receptor layer is extruded to the backing layer, the thus-formed composite structure can be allowed to cool to ambient temperature, which is generally below about 180° F. (82° C.). However, such cooling is not necessarily required. The composite structure is then heated, if necessary, to a temperature of at least about 180° F. (82° C.), preferably from about 240° F. (116° C.) to about 310° F. (154° C.). The additional heating step is not necessary if the temperature of the composite structure is at the desired level for the irradiating step of the bonding process (e.g., 240° F. (116° C.) to 310° F. (154° C.)). The heated composite structure is then subjected to ultraviolet radiation, whereby the receptor layer 42 is securely bonded to the backing layer 50. The length of time that the composite structure must be irradiated is dependent upon the source of radiation utilized and the distance that the composite structure is from the source of radiation. Preferably, the irradiation is carried out at an intensity and for a time effective to impart a bond strength between the receptor layer 42 and the backing layer 50 of a strength of at least about 80 ounces/inch (893 g/cm). The bound strength may be higher or lower as desired, and can be varied depending on the intended use of the imaging medium 40. One particularly useful set of irradiation conditions includes irradiating the composite structure for a period of about 5 to 10 seconds at a distance of from about 3 to 5 centimeters from a conventional source of ultraviolet radiation, such as, for example, an apparatus having the trade designation "Fusion UV Curing System" available commercially from Fusion Systems Corporation, of Rockville, Md. A preferred such UV lamp emits a wavelength range of about 200–500 nm with a peak wavelength of about 254 nm. A typical radiation intensity is at least about 90 watts/inch, preferably about 120 watts/inch. The process for irradiation with ultraviolet radiation is described in more detail in U.S. Pat. No. 3,188,265 (Charbonneau, et al.) and U.S. Pat. No. 3,188,266 (Charbonneau, et al.), the entire discloses of both of which are incorporated herein by reference. The specific conditions of heating and irradiation depend on the thickness and composition of the receptor layer and backing layer, and on the desired bond strength.

A preferred embodiment of imaging medium 40 can be prepared by extruding a 0.038 cm (0.0015 inch) thick receptor layer 42 comprising either ethylene co- or terpolymer or a blend of the ethylene co- or terpolymer with an ionomeric resin and/or other additives onto a 0.0025 cm (0.001 inch) thick polyester backing layer 50, allowing the thus-formed composite structure to cool, heating the cooled composite structure to a temperature of about 280° F. (138° C.), and then exposing the heated composite to ultraviolet radiation for a duration of about five (5) seconds. The source of ultraviolet radiation is preferably a "Fusion UV Curing Systems" apparatus containing a lamp that emits radiation over a wavelength range of about 200–500 nm with a peak wavelength at about 254 nm, commercially available from Fusion Systems Corporation. The lamp is preferably located about 2 inches (5.08 cm) from the composite structure. The intensity is preferably about 120 watts/inch.

In a preferred embodiment, a terpolymer comprising ethylene, n-butylacrylate, and methacrylic acid (EAMA) commercially available under the trade designation "BYNEL CXA 2002" from du Pont is extruded at a thickness of about 25 micrometers (0.001 inches) onto a polyester backing layer approximately 14 micrometers (0.00056 inches) thick. The composite film is heated to about 110° C. (230° F.) and is then irradiated with UV light for about 5 seconds. It is believed that the heating and UV light promotes formation of chemical bonds between the EAMA and polyester layers.

In another preferred embodiment, a receptor layer is comprising 80% by weight terpolymer comprising ethylene, n-butylacrylate, and methacrylic acid (EAMA) commercially available as "BYNEL CXA 2002" from du Pont and 20% by weight neutralized ethylene-methacrylic acid copolymer commercially available as "SURLYN 1705-1" from du Pont is blended in situ using a single or twin screw extruder and extruded at a thickness of about 25 micrometers (0.001 inches) onto a polyester backing layer approximately 14 micrometers (0.00056 inches) thick. The composite film is heated to 110° C. (230° F.) and is then irradiated with UV light for about 5 seconds. It is believed that the heating and UV light promotes formation of chemical bonds between the receptor and backing layers.

Adhesives useful in the preparation of an adhesive coated imaging medium according to the present invention include both pressure sensitive and non-pressure sensitive adhesives such as hot melt and curable adhesives. Pressure sensitive adhesives are normally tacky at room temperature and can be adhered to a surface by application of, at most, light finger pressure, while non-pressure sensitive adhesives include solvent, heat, or radiation activated adhesive systems. Pressure sensitive adhesives are a preferred class of adhesives for use in the present invention. Examples of adhesives useful in the invention include those based on general compositions of polyacrylate; polyvinyl ether; diene-containing rubber such as natural rubber, polyisoprene, and polyisobutylene; polychloroprene; butyl rubber; butadiene-acrylonitrile polymer; thermoplastic elastomer; block copolymers such as styrene-isoprene and styrene-isoprene-styrene block copolymers, ethylene-propylene-diene polymers, and styrene-butadiene polymer; poly-alpha-olefin; amorphous polyolefin; silicone; ethylene-containing copolymer such as ethylene vinyl acetate, ethylacrylate, and ethyl methacrylate; polyurethane; polyamide; epoxy; polyvinylpyrrolidone and vinylpyrrolidone copolymers; polyesters; and mixtures of the above. Additionally, the adhesives can contain additives such as tackifiers, plasticizers, fillers, antioxidants, stabilizers, pigments, diffusing particles, curatives, and solvents.

A general description of useful pressure sensitive adhesives may be found in *Encyclopedia of Polymer Science and Engineering,* Vol. 13, Wiley-Interscience Publishers (New York, 1988). Additional description of useful pressure sensitive adhesives may be found in *Encyclopedia of Polymer Science and Technology,* Vol. 1, Interscience Publishers (New York, 1964).

Other pressure sensitive adhesives useful in the invention are described in the patent literature. Examples of these patents include Re 24,906 (Ulrich), U.S. Pat. No. 3,389,827 (Abere et al.), at Col. 4-Col. 5, U.S. Pat. No. 4,080,348 (Korpman), U.S. Pat. No. 4,136,071 (Korpman), U.S. Pat. No. 4,181,752 (Martens et al.), U.S. Pat. No. 4,792,584 (Shiraki et al.), U.S. Pat. No. 4,883,179 (Young et al.), and U.S. Pat. No. 4,952,650 (Young et al.). Commercially available adhesives are also useful in the invention. Examples include those adhesives available from 3M Company, St. Paul, Minn.; H.B. Fuller Company, St. Paul, Minn.; Century Adhesives Corporation, Columbus, Ohio; National Starch and Chemical Corporation, Bridgewater, N.J.; Rohm and Haas Company, Philadelphia, Pa.; and Air Products and Chemicals, Inc., Allentown, Pa.

Toner

Toners typically comprise pigments, binder, carrier solvent, dispersing agents, and charge additives. Preferably, the toner comprises thermoplastic toner particles in a liquid carrier that is not a solvent for the particles at a first temperature and that is a solvent for the particles at a second temperature, especially those disclosed in U.S. Pat. No. 5,192,638, "Toner for Use in Compositions for Developing Latent Electrostatic Images, Method of Making the Same, and Liquid Composition Using the Improved Toner" (Landa et al.), the entire disclosure of which is incorporated herein by reference. Landa et al. '638 discloses a liquid composition for developing latent electrostatic images comprising toner particles associated with a pigment dispersed in a nonpolar liquid. The toner particles are formed with a plurality of fibers or tendrils from a thermoplastic polymer and carry a charge of a polarity opposite to the polarity of the latent electrostatic image. The polymer is insoluble or insolvatable in the dispersant liquid at room temperature. The toner particles are formed by plasticizing the polymer and pigment at elevated temperature and then either permitting a sponge to form and wet-grinding pieces of the sponge or diluting the plasticized polymer-pigment while cooling and constantly stirring to prevent the forming of a sponge while cooling. When cool, the diluted composition will have a concentration of toner particles formed with a plurality of fibers.

These fibers are formed from a thermoplastic polymer and are such that they may interdigitate, intertwine, or interlink physically in an image developed with a developing liquid through which has been dispersed the toner particles of the instant invention. The result is an image on the photoconductor having good sharpness, line acuity—that is, edge acuity—and a high degree of resolution. The developed image on the photoconductor has good compressive strength, so that it may be transferred from the surface on which it is developed to the imaging medium without squash. The intertwining of the toner particle permits building a thicker image and still obtaining sharpness. The thickness can be controlled by varying the charge potential on the photoconductor, by varying the development time, by varying the toner-particle concentration, by varying the conductivity of the toner particles, by varying the charge characteristics of the toner particles, by varying the particle size, or by varying the surface chemistry of the particles. Any or a combination of these methods may be used.

In addition to being thermoplastic and being able to form fibers as above defined, the polymer used in the particles of Landa et al. '683 preferably has the following characteristics: it is able to disperse a pigment (if a pigment is desired); it is insoluble in the dispersant liquid at temperatures below 40° C., so that it will not dissolve or solvate in storage; it is able to solvate at temperatures above 50° C.; it is able to be ground to form particles between 0.1 micron and 5 microns in diameter; it is able to form a particle of less than 10 microns; it is able to fuse at temperatures in excess of 70° C.; by solvation, the polymers forming the toner particles will become swollen or gelatinous. This indicates the formation of complexes by the combination of the molecules of the polymer with the molecules of the dispersant liquid.

Landa et al. '683 discloses three methods of forming toner particles having the desired fibrous morphology. The first method briefly includes dispersing or dissolving pigment particles in a plasticized polymer at temperatures between 65° C. and 100° C. The plasticized material when cooled has the form of a sponge. The sponge is then broken into smaller pieces and ground. Another method includes dissolving one or more polymers in a nonpolar dispersant, together with particles of a pigment such as carbon black or the like. The solution is allowed to cool slowly while stirring, which is an essential step in this method of forming the fiber-bearing toner particles. As the solution cools, precipitation occurs, and the precipitated particles will be found to have fibers extending therefrom. A third method is to heat a polymer above its melting point and disperse a pigment through it. In this method, fibers are formed by pulling the pigmented thermoplastic polymer apart without first forming a sponge. The fibrous toner particles, formed by any of the foregoing methods, are dispersed in a nonpolar carrier liquid, together with a charge director known to the art, to form a developing composition.

Landa et al. '683 discloses a toner particle formed with a plurality of fibers-that is to say, one with such morphology. Such a toner particle enables forming a developing composition for developing latent electrostatic images by dispersing the toner particles in small amounts in a nonpolar liquid such as an ISOPAR. The weight of the toner particle may be as low as 0.2 percent by weight of the weight of the dispersant liquid. The toner particle is pigmented and formed of a polymeric resin. A charge director is added to the composition in small amounts, which may be as low as one-tenth percent by weight of the weight of the toner particles in the developing composition. The charge director may be selected to impart either a positive or a negative charge to the toner particles, depending on the charge of the latent image. Those in the art will understand that the charge on the toner particles is generally opposite in polarity to that carried by the latent electrostatic image.

In Landa et al. '683, the nonpolar dispersant liquids are, preferably, branched-chain aliphatic hydrocarbons-more particularly, ISOPAR-G, ISOPAR-H, ISOPAR-K, ISOPAR-L, and ISOPAR-M. These ISOPARs are narrow cuts of isoparaffinic hydrocarbon fractions with extremely high levels of purity. For example, the boiling range of ISOPAR-G is between 156° C. and 176° C. ISOPAR-L has a mid-boiling point of approximately 194° C. ISOPAR-M has a flash point of 77° C. and an auto-ignition temperature of 338° C. They are all manufactured by the Exxon Corporation. Light mineral oils, such as MARCOL 52 or MARCOL 62, manufactured by the Humble Oil and Refining Company, may be used. These are higher boiling aliphatic hydrocarbon liquids.

The polymers used in Landa et al. '683 are thermoplastic, and the preferred polymers are known as ELVAX II, manufactured by du Pont, including resin numbers 5550; 5610; 5640; 5650T; 5720; and 5950. The original ELVAX resins (EVA) were the ethylene vinyl acetate copolymers. The new family of ELVAX resins, designated ELVAX II, are ethylene copolymers combining carboxylic acid functionality, high molecular weight, and thermal stability. The preferred ethylene copolymer resins of Landa et al. '683 are the ELVAX II 5720 and 5610. Other polymers which are usable are the original ELVAX copolymers and polybutyl terethalate. Still other useful polymers made by Union Carbide are the DQDA 6479 Natural 7 and DQDA 6832 Natural 7. These are ethylene vinyl acetate resins. Other useful polymers are NUCREL ethylene acrylic acid copolymers available form du Pont.

Landa et al. '683 also discloses that another useful class of polymers in making the particles are those manufactured by du Pont and sold under the trademark ELVACITE. These are methacrylate resins, such as polybutyl methacrylate (Grade 2044), polyethyl methacrylate (Grade 2028), and polymethyl methacrylate (Grade 2041). If desired, a minor amount of carnauba wax may be added to the composition. However, this tends to produce bleed-through and an oil fringe on the copy and is not preferred. Furthermore, if a hard polymer such as 5650T is used, a minor amount of hydroxy-ethyl cellulose may be added. This is not preferred.

The polymers of Landa et al. '683 are normally pigmented so as to render the latent image visible, though this need not be done in some applications. The pigment may be present in the amount of 10 percent to 35 percent by weight in respect of the weight of the polymer, if the pigment be Cabot Mogul L (black pigment). If the pigment is a dye, it may be present in an amount of between 3 percent and 25 percent by weight in respect of the weight of the polymer. If no dye is used—as, for example, in making a toner for developing a latent image for a printing plate—an amount of silica such as CABOSIL may be added to make the grinding easier. Examples of pigments are Monastral Blue G (C.I. Pigment Blue 15 C.I. No. 74160), Toluidine Red Y (C.I. Pigment Red 3), Quindo Magenta (Pigment Red 122), Indo Brilliant Scarlet Toner (Pigment Red 123, C.I. No. 71145), Toluidine Red B (C.I. Pigment Red 3), Watchung Red B (C.I. Pigment Red 48), Permanent Rubine F6B13-1731 (Pigment Red 184), Hansa Yellow (Pigment Yellow 98), Dalamar Yellow (Pigment Yellow 74, C.I. No. 11741), Toluidine Yellow G (C.I. Pigment Yellow 1), Monastral Blue B (C.I. Pigment Blue 15), Monastral Green B (C.I. Pigment Green 7), Pigment Scarlet (C.I. Pigment Red 60), Auric Brown (C.I.

Pigment Brown 6), Monastral Green G (Pigment Green 7), Carbon Black, and Stirling NS N 774 (Pigment Black 7, C.I. No. 77266).

Landa et al '683 also discloses that a finely ground ferromagnetic material may be used as a pigment. About 40 percent to about 80 percent by weight of Mapico Black is preferred, with about 65 percent Mapico Black being optimum, other suitable materials such as metals including iron, cobalt, nickel, various magnetic oxides including $Fe_2O_3$, $Fe_3O_4$, and other magnetic oxides; certain ferrites such as zinc, cadmium, barium, manganese; chromium dioxide; various of the permalloys and other alloys such as cobalt-phosphorus, cobalt-nickel, and the like; or mixtures of any of these may be used.

Landa et al. '683 theorizes that, in dispersion, all of the toner particles have the same polarity of charge. When the particles approach each other, they are repelled, owing to the fact that each possesses a charge of the same polarity. When the latent electrostatic image is developed, the toner particles are impelled to go to the latent electrostatic image, which has a higher potential and a charge of opposite polarity. This forces the toner particles to associate with each other and to mat or interdigitate. The fact that the toner particles in the developed image are matted enables a more complete transfer from the photoconductor to be made to the carrier sheet. The matting also prevents spreading of the edges of the image and thus preserves its acuity. The small diameter of the toner particles ensures good resolution, along with the other results outlined above.

It is known that to impart a negative charge to the particles, such charge directors as magnesium petronate, magnesium sulfonate, calcium petronate, calcium sulfonate, barium petronate, barium sulfonate, or the like, may be used. The negatively charged particles are used to develop images carrying a positive charge, as is the case with a selenium-based photoconductor. With a cadmium-based photoconductor, the latent image carries a negative charge and the toner particles must therefore be positively charged. A positive charge can be imparted to the toner particles with a charge director such as aluminum stearate. The amount of charge director added depends on the composition used and can be determined empirically by adding various amounts to samples of the developing liquid.

Figure 4:
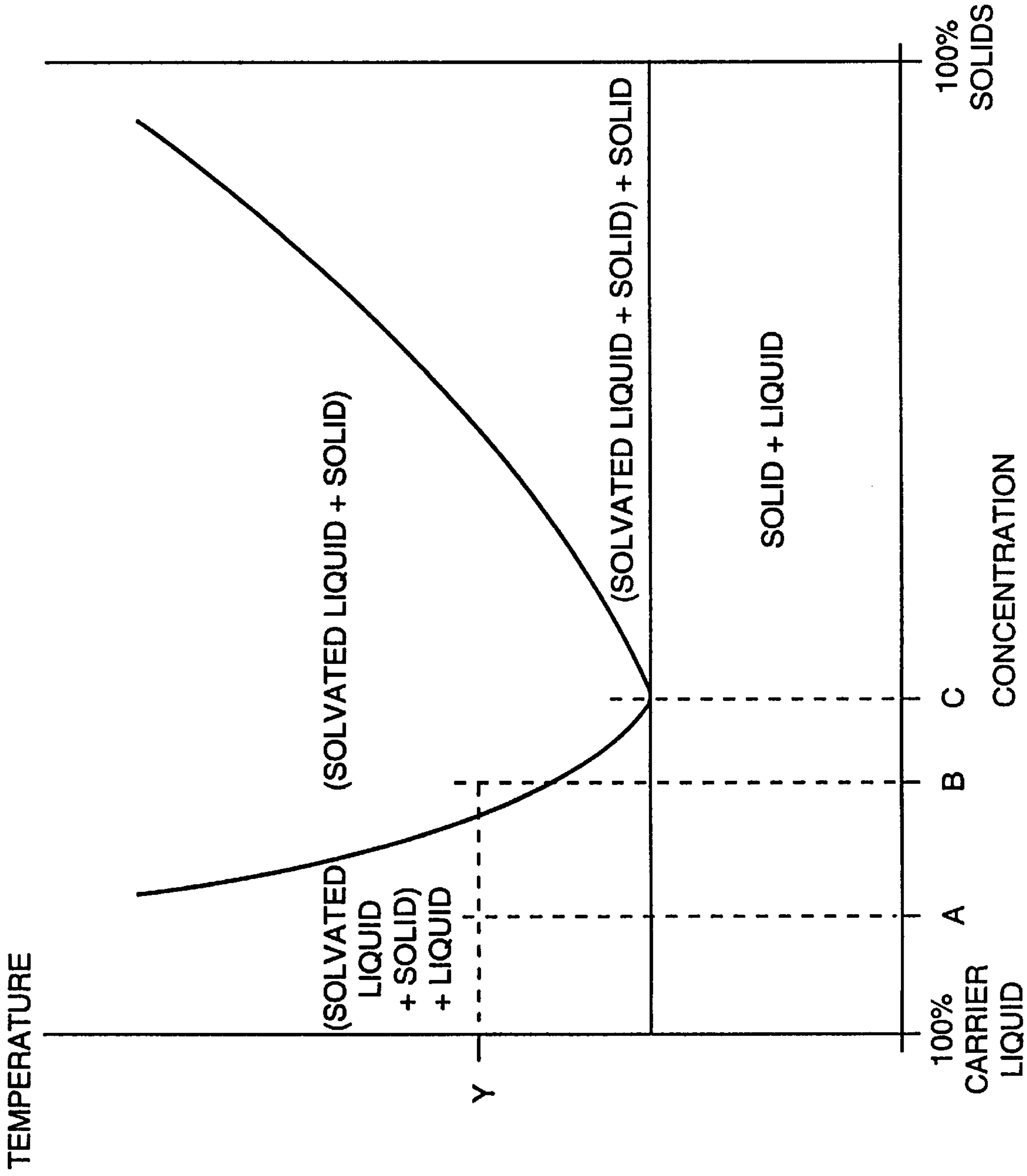
FIG. 4 is part of a simplified typical phase diagram for a preferred toner for use with the present invention.

The invention can be practiced using a variety of toner types but is especially useful for toners comprising carrier liquid and pigmented polymeric toner particles which are essentially non-soluble in the carrier liquid at room temperature, and which solvate carrier liquid at elevated temperatures. This is a characteristic of the toner of Example 1 of U.S. Pat. No. 4,794,651, previously incorporated by reference. Part of a simplified phase diagram of a typical toner of this type is shown in FIG. 4. This diagram represents the states of the polymer portion of the toner particles and the carrier liquid. The pigment in the particles generally takes little part in the process, and references herein to "single phase" and to "salvation" refer to the state of the polymer part of the toner particles together with the carrier liquid. In a preferred embodiment, the toner is prepared by mixing 10 parts of ELVAX II 5950 ethylene vinyl acetate copolymer (from E.I. du Pont) and 5 parts by weight of ISOPAR L (Exxon) diluent which is not a solvent for the ELVAX II 5950 at room temperature. The mixing is performed at low speed in a jacketed double planetary mixer connected to an oil heating unit for one hour, the heating unit being set at 130° C. A mixture of 2.5 parts by weight of Mogul L carbon black (Cabot) and 5 parts by weight of ISOPAR L is then added to the mix in the double planetary mixer and the resultant mixture is further mixed for one hour at high speed. 20 parts by weight of ISOPAR L pre-heated to 110° C. are added to the mixer and mixing is continued at high speed for one hour. The heating unit is disconnected and mixing is continued until the temperature of the mixture drops to 40° C. 100 g of the resulting material is mixed with 120 g of ISOPAR L and the mixture is milled for 19 hours in an attritor to obtain a dispersion of particles. The material is dispersed in ISOPAR L to a solids content of 1.5% by weight. The preferred liquid developer prepared comprises toner particles which are formed with a plurality of fibrous extensions or tendrils as described above. The preferred toner is characterized in that when the concentration of toner particles is increased above 20%, the viscosity of the material increases greatly, apparently in approximately an exponential manner. A charge director, prepared in accordance with the Example of U.S. Pat. No. 5,047,306, "Humidity Tolerant Charge Director Compositions" (Almog), the entire disclosure of which is incorporated herein by reference, is preferably added to the dispersion in an amount equal to about 3% of the weight of the solids in the developer.

Another preferred toner for use with the present invention are commercially known as ELECTROINK for E-PRINT 1000 manufactured by Indigo Ltd. of Rehovot, Israel.

Imaging Methods and Apparatus

In electrophotographic processes, an electrostatic image may be produced by providing a photoconductive layer, such as on a rotating drum, with a uniform electrostatic charge and thereafter selectively discharging the electrostatic charge by exposing it to a modulated beam of radiant energy. It will be understood that other methods may be employed to form an electrostatic image, such, for example, as providing a carrier with a dielectric surface and transferring a preformed electrostatic charge to the surface. The charge may be formed from an array of styluses. A latent image is thus formed on the charged drum. Charged toner is deposited on the charged areas of the drum, and the toner is then transferred under heat and/or pressure to the imaging medium 10, 40. Preferably, the toner can be transferred in an intermediate step to a transfer member between the charged drum and the imaging medium.

While the present invention can be advantageously used with many known electrophotographic methods and apparatuses, a particularly preferred apparatus and method is disclosed in U.S. Pat. No. 5,276,492, "Imaging Method and Apparatus" (Landa et al.), the entire disclosure of which is incorporated herein by reference.

In a preferred embodiment of the invention, a liquid toner image is transferred from an image forming surface to an intermediate transfer member for subsequent transfer to a final substrate. The liquid toner image includes a liquid portion including carrier liquid and a solids portion including pigmented polymeric toner particles which are essentially non-soluble in the carrier liquid at room temperature, and the polymer portion of which forms substantially a single phase with carrier liquid at elevated temperatures. The preferred imaging method generally includes the steps of concentrating the liquid toner image to a given non-volatile solids percentage by compacting the solids portion thereof and removing carrier liquid therefrom; transferring the liquid toner image to an intermediate transfer member; heating the liquid toner image on the intermediate transfer member to a temperature at least as high as that at which the polymer portion of the toner particles and the carrier liquid form substantially a single phase at the given solids percentage; and transferring the heated liquid toner image to a final substrate.

Liquid toner images are developed by varying the density of pigmented solids in a developer material on a latent image bearing surface in accordance with an imaged pattern. The variations in density are produced by the corresponding pattern of electric fields extending outward from the latent image bearing surface. The fields are produced by the different latent image and background voltages on the latent image bearing surface and a voltage on a developer plate or roller. In general, developed liquid toner images comprise carrier liquid and toner particles and are not homogeneous.

To improve transfer of a developed image from the latent image bearing surface to a substrate, it is most desirable to ensure that, before transfer, the pigmented solids adjacent background regions are substantially removed and that the density of pigmented solids in the developed image is increased, thereby compacting or rigidizing the developed image. Compacting or rigidizing of the developed image increases the image viscosity and enhances the ability of the image to maintain its integrity under the stresses encountered during image transfer It is also desirable that excess liquid be removed from the latent image bearing surface before transfer.

Many methods are known to remove the carrier liquid and pigmented solids in the region beyond the outer edge of the image and thus leave relatively clean areas above the background. The technique of removing carrier liquid is known generally as metering. Known methods include employing a reverse roller spaced about 50 microns from the latent image bearing surface, an air knife, and corona discharge. It is also known to effect image transfer from a photoreceptor onto a substrate backed by a charged roller. Unless the image is rigidized before it reaches the nip of the photoreceptor and the roller, image squash and flow may occur.

Figure 3:
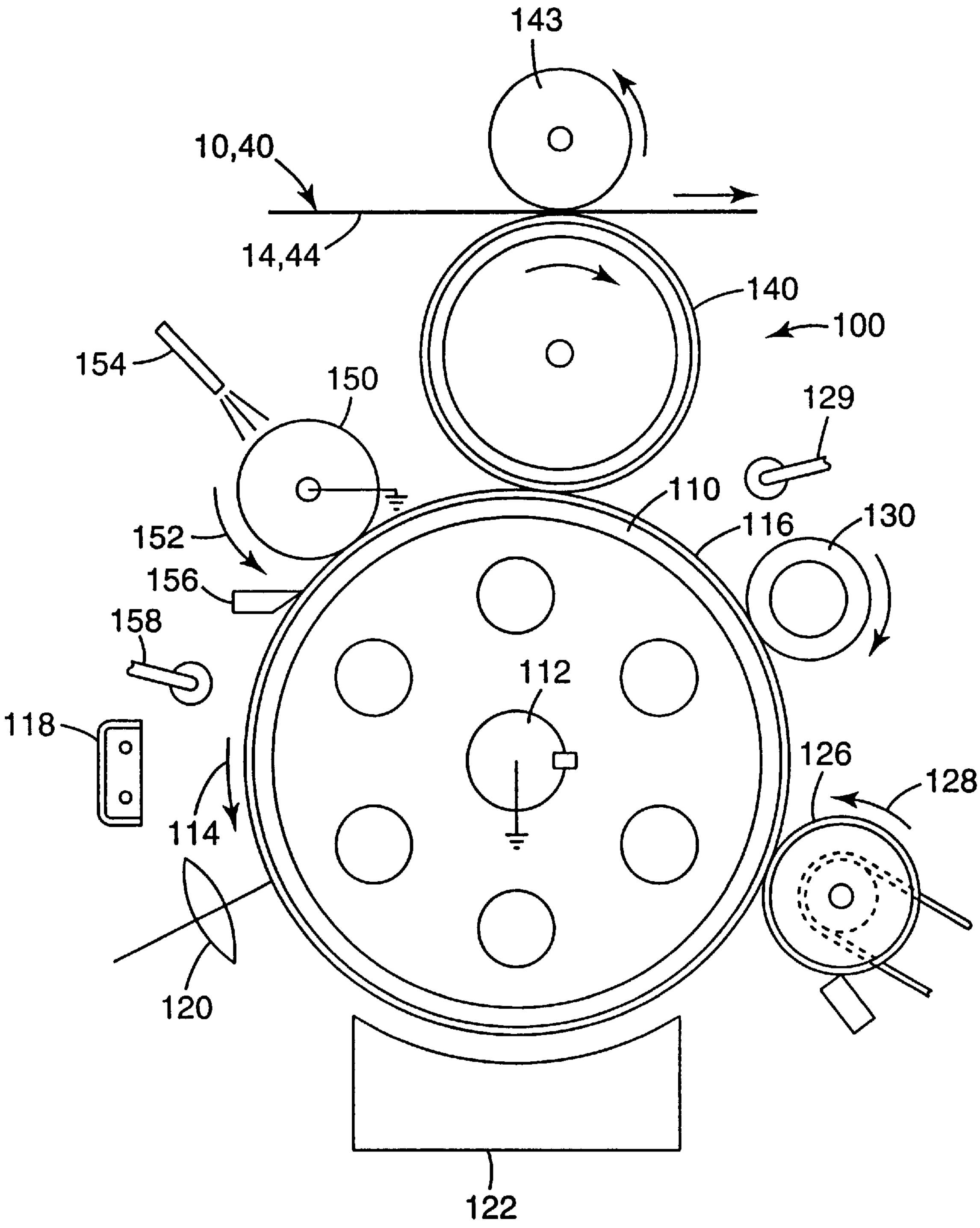
FIG. 3 is a partial schematic view of an electrophotographic imaging apparatus for use with the present invention.

FIG. 3 illustrates a preferred electrophotographic imaging apparatus 100 for use with the present invention. The apparatus is described for liquid developer systems with negatively charged toner particles, and negatively charged photoconductors, i.e., systems operating in the reversal mode. For other combinations of toner particle and photoconductor polarity, the values and polarities of the voltages are changed, in accordance with the principles of the invention.

As in conventional electrophotographic systems, the apparatus 100 of FIG. 3 typically comprises a drum 110 arranged for rotation about an axle 112 in a direction generally indicated by arrow 114. Drum 110 is formed with a cylindrical photoconductor surface 116.

A corona discharge device 118 is operative to generally uniformly charge photoconductor surface 116 with a negative charge. Continued rotation of drum 110 brings charged photoconductor surface 116 into image receiving relationship with an exposure unit including a lens 120, which focuses an image onto charged photoconductor surface 116, selectively discharging the photoconductor surface, thus producing an electrostatic latent image thereon. The latent image comprises image areas at a given range of potentials and background areas at a different potential. The image may be laser generated as in printing from a computer or it may be the image of an original as in a copier.

Continued rotation of drum 110 brings charged photoconductor surface 116, bearing the electrostatic latent image, into a development unit 122, which is operative to apply liquid developer, comprising a solids portion including pigmented toner particles and a liquid portion including carrier liquid, to develop the electrostatic latent image. The developed image includes image areas having pigmented toner particles thereon and background areas. Development unit 122 may be a single color developer of any conventional type, or may be a plurality of single color developers for the production of full color images as is known in the art. Alternatively, full color images may be produced by changing the liquid toner in the development unit when the color to be printed is changed. Alternatively, highlight color development may be employed, as is known in the art.

In accordance with a preferred embodiment of the invention, following application of toner thereto, photoconductor surface 116 passes a typically charged rotating roller 126, preferably rotating in a direction indicated by an arrow 128. Typically, the spatial separation of the roller 126 from the photoconductor surface 116 is about 50 microns. Roller 126 thus acts as a metering roller as is known in the art, reducing the amount of carrier liquid on the background areas and reducing the amount of liquid overlaying the image. Preferably the potential on roller 126 is intermediate that of the latent image areas and of the background areas on the photoconductor surface. Typical approximate voltages are: roller 126: 500 V, background area: 1000 V and latent image areas: 150 V. The liquid toner image which passes roller 126 should be relatively free of pigmented particles except in the region of the latent image.

Downstream of roller 126 there is preferably provided a rigidizing roller 130. Rigidizing roller 130 is preferably formed of resilient polymeric material, such as polyurethane which may have only its natural conductivity or which may be filled with carbon black to increase its conductivity. According to one embodiment of the invention, roller 130 is urged against photoconductor surface 116 as by a spring mounting (not shown). The surface of roller 130 typically moves in the same direction and with the same velocity as the photoconductor surface to remove liquid from the image.

Preferably, the biased squeegee described in U.S. Pat. No. 4,286,039, "Method and Apparatus for Removing Excess Developing Liquid From Photoconductive Surfaces" (Landa et al.), the entire disclosure of which is incorporated herein by reference, is used as the roller 130. Roller 130 is biased to a potential of at least several hundred and up to several thousand Volts with respect to the potential of the developed image on photoconductor surface 116, so that it repels the charged pigmented particles and causes them to more closely approach the image areas of photoconductor surface 116, thus compacting and rigidizing the image.

In a preferred embodiment of the invention, rigidizing roller 130 comprises an aluminum core having a 20 mm diameter, coated with a 4 mm thick carbon-filled polyurethane coating having a Shore A hardness of about 30–35, and a volume resistivity of about $10^8$ ohm-cm. Preferably roller 130 is urged against photoconductor surface 116 with a pressure of about 40–70 grams per linear cm of contact, which extends along the length of the drum. The core of rigidizing roller 130 is energized to between about 1800 and 2800 volts, to provide a voltage difference of preferably between about 1600 and 2700 volts between the core and the photoconductor surface in the image areas. Voltage differences of as low as 600 volts are also useful.

After rigidization under these conditions and for the preferred toner, the solids percentage in the image portion is believed to be as high as 35% or more, when carrier liquid absorbed as plasticizer is considered as part of the solids portion. It is preferable to have an image with at least 25–30% solids, after rigidizing. When the solids percentage is calculated on a non-volatile solids basis, the solids percentage is preferably above 20% and is usually less than 30%. Values of 25% have been found to be especially useful. At these concentrations the material has a paste like consistency.

Alternatively, the carbon filled polyurethane can be replaced by unfilled polyurethane with a volume resistivity of about $3\times10^{10}$, and the voltage is adjusted to give proper rigidizing.

Downstream of rigidizing roller 130 there is preferably provided a plurality of light emitting diodes (LEDs) 129 to discharge the photoconductor surface, and equalize the potential between image and background areas. For process color systems, where yellow, magenta and cyan toners are used, both red and green LEDs are provided to discharge the areas of the photoconductor behind the developed image as well as the background areas.

Downstream of LEDs 129 there is provided an intermediate transfer member 140, which rotates in a direction opposite to that of photoconductor surface 116, as shown by the arrow. The intermediate transfer member is operative for receiving the toner image from the photoconductor surface and for subsequently transferring the toner image to a the imaging medium 10 or 40.

Various types of intermediate transfer members are known and are described, for example, in U.S. Pat. No. 4,684,238, "Intermediate Transfer Apparatus" (Till et al.) and U.S. Pat. No. 5,028,964, "Imaging System With Rigidizer And Intermediate Transfer Member" (Landa et al.) the entire disclosures of both of which are incorporated herein by reference.

In general, intermediate transfer member 140 is urged against photoconductor surface 116. One of the effects of the rigidization described above is to prevent substantial squash or other distortion of the image caused by the pressure resulting from the urging. The rigidization effect is especially pronounced due to the sharp increase of viscosity with concentration for the preferred toner.

Transfer of the image to intermediate transfer member is preferably aided by providing electrical bias to the intermediate transfer member 140 to attract the charged toner thereto, although other methods known in the art may be employed. Subsequent transfer of the image to imaging surface 14 or 44 of receptor layer 12 or 42, respectively, on the imaging medium is preferably aided by heat and pressure, with pressure applied by a backing roller 143, although other methods known in the art may be employed.

Following transfer of the toner image to the intermediate transfer member, photoconductor surface 116 is engaged by a cleaning roller 150, which typically rotates in a direction indicated by an arrow 152, such that its surface moves in a direction opposite to the movement of adjacent photoconductor surface 116 which it operatively engages. Cleaning roller 150 is operative to scrub and clean surface 116. A cleaning material, such as toner, may be supplied to the cleaning roller 150, via a conduit 154. A wiper blade 156 completes the cleaning of the photoconductor surface. Any residual charge left on photoconductor surface 116 is removed by flooding the photoconductor surface with light from a lamp 158.

In a multi-color system, subsequent to completion of the cycle for one color, the cycle is sequentially repeated for other colors which are sequentially transferred from photoconductor surface 116 to intermediate transfer member 140. The single color images may be sequentially transferred to the imaging medium 10 or 40 in alignment, or may alternatively be overlaid on the intermediate transfer member 140 and transferred as a group to the imaging medium.

Details of the construction of the surface layers of preferred intermediate transfer members are shown in U.S. Pat. No. 5,089,856, "Image Transfer Apparatus Incorporating An Integral Heater" (Landa et al.), the entire disclosure of which is incorporated herein by reference. Generally, the image is heated on intermediate transfer member 140 in order to facilitate its transfer to imaging medium 10 or 40. This heating is preferably to a temperature above a threshold temperature of substantial solvation of the carrier liquid in the toner particles.

As seen in FIG. 4, when the image is heated, the state of the image, i.e. of the polymer portion of the toner particles and the carrier liquid, depends on several factors, mainly on the temperature of the intermediate transfer member and on the concentration of toner particles. Thus, if the percentage of toner particles is "A" and the intermediate transfer member temperature is "Y" the liquid image separates into two phases, one phase being substantially a liquid polymer/carrier-liquid phase and the other phase consisting mainly of carrier liquid. On the other hand, if the percentage of toner particles is "B" at the same temperature, then substantially only one phase, a liquid polymer/carrier-liquid phase will be present. It is believed to be preferable that separate liquid polymer/carrier-liquid and liquid phases do not form to any substantial degree, as will be the case for example if the concentration is "C".

This type of phase separation is believed to be undesirable on the intermediate transfer member 140. It is believed that an absence of substantial phase separation of this type in the image on the intermediate transfer member results in improved image quality, including an improvement in line uniformity.

It is understood that heating the image on the intermediate transfer member 140 is not meant to completely dry the image, although some evaporation of carrier liquid may result. Rather, the image on the intermediate transfer member remains a viscous liquid until its transfer to the final substrate.

Other methods of concentrating the image than those just described, i.e., compacting the solids portion thereof and removing liquid therefrom, can be utilized provided they concentrate the image to the extent required. These methods include the use of separate solids portion compactors and liquid removal means, such as those described in U.S. Pat. No. 5,028,964, previously incorporated herein by reference. Alternatively the apparatus may utilize a solids portion compactor followed by an intermediate transfer member urged against the photoconductor to remove liquid from the image. As a further alternative, the commutated intermediate transfer member described in the '964 patent may be used to provide both solids portion compacting and liquid removal, just prior to transfer to the intermediate transfer member. Furthermore the concentrating step may take place on the intermediate transfer member after transfer of the liquid toner image thereto and before heating the image.

The receptor layers of the present invention provide a superior bond to the toners described herein when applied by electrophotographic printing methods just described. This is believed to result from the chemical compatibility between the toner's carrier resin and the receptor layer. Without desiring to be bound by any particular theory, it is presently believed that the thermoplastic toners described herein have a solubility parameter that is a close match to that of the receptor layer. This indicates a chemical compatibility between the receptor layer and the toner polymer resulting in a strong bond between the toner and the receptor layer.

The embodiments of the imaging media of the present invention having a receptor layer bonded to a backing layer, such a polyester backing layer, under heat and UV irradiation are particularly durable and abrasion resistant. The receptor layer has a high affinity for the toner, as just described, and the receptor layer has a strong bond to the durable backing layer. This strong bond between the receptor layer and the backing layer makes for a more durable and abrasion resistant imaging medium than a receptor layer bonded to a backing layer by conventional methods.

The imaging media of the present invention are well suited for use as labels, tags, tickets, signs, data cards, name plates, and packaging films, for example, although the uses of the imaging media of the present invention are not thereby limited.

The present invention has now been described with reference to several embodiments thereof. The foregoing detailed description has been given for clarity of understanding only. No unnecessary limitations are to be understood therefrom. It will be apparent to those skilled in the art that many changes can be made in the embodiments described without departing from the scope of the invention. Thus, the scope of the present invention should not be limited to the exact details and structures described herein, but rather by the structures described by the language of the claims, and the equivalents of those structures.

What is claimed is:

1. An imaging medium comprising:

a receptor layer comprising a polymer of ethylene and vinyl acetate, having a melt point index of at least 2.5 grams/10 minutes and a vinyl acetate content of from 15 to 35% by weight, wherein the polymer further comprises methacrylic acid in an amount of at least 1.0% by weight; and a backing layer bonded to the receptor layer by extruding the receptor layer onto the backing layer and irradiating the receptor layer and backing layer with ultraviolet radiation while being heated to at least 180° F.

2. The imaging medium of claim 1, wherein the backing layer comprises polyester.

3. An imaging medium comprising:

a receptor layer comprising a polymer of ethylene and vinyl acetate, having a melt point index of at least 2.5 grams/10 minutes and a vinyl acetate content of from 15 to 35% by weight, wherein the polymer further comprises an unsaturated anhydride in an amount of at least 0.1% by weight; and a backing layer bonded to the receptor layer by extruding the receptor layer onto the backing layer and irradiating the receptor layer and backing layer with ultraviolet radiation while being heated to at least 180° F.

4. The imaging medium of claim 3, wherein the backing layer comprises polyester.

5. An imaging medium comprising:

a receptor layer comprising a polymer of ethylene and an alkyl (meth)acrylate, having a melt point index of at least 2.5 grams/10 minutes and an acrylate content of from 10 to 30% by weight; and a backing layer bonded to the receptor layer by extruding the receptor layer onto the backing layer and irradiating the receptor layer and backing layer with ultraviolet radiation while being heated to at least 180° F., wherein the backing layer comprises polyester.

6. The imaging medium of claim 5, wherein the polymer further comprises methacrylic acid in an amount of at least 3.0% by weight.

7. An imaging medium comprising:

a receptor layer comprising a polymer of ethylene and an alkyl (meth)acrylate, having a melt point index of at least 2.5 grams/10 minutes and an acrylate content of from 10 to 30% by weight, wherein the polymer further comprises an unsaturated anhydride in an amount of at least 0.1% by weight; and a backing layer bonded to the receptor layer by extruding the receptor layer onto the backing layer and irradiating the receptor layer and backing layer with ultraviolet radiation while being heated to at least 180° F.

8. An imaging medium comprising:

a receptor layer comprising a polymer of ethylene and an acid selected from methacrylic acid or unsaturated carboxylic acid, having a melt point index of at least 2.5 grams/10 minutes and an acid content of from 8 to 20% by weight; and a backing layer bonded to the receptor layer by extruding the receptor layer onto the backing layer and irradiating the receptor layer and backing layer with ultraviolet radiation while being heated to at least 180° F., wherein the backing layer comprises polyester.

9. The imaging medium of claim 8, wherein the acid has been neutralized with a metal cation thereby forming an ionomer, having a neutralized acid content of from 2 to 6% by weight and an acid content of no more than 15% by weight.

10. The imaging medium of claim 9, wherein the ionomer comprises a neutralized ethylene-co-methacrylic acid ionomer.

11. An imaging medium comprising:

a receptor layer comprising a first polymer of ethylene, n-butylacrylate, and methacrylic acid having a melt point index of at least 2.5 grams/10 minutes, wherein the receptor layer further comprises a second polymer comprising a neutralized ethylene-co-methacrylic acid ionomer; and a polyester backing layer bonded to the receptor layer by extruding the receptor layer onto the backing layer and irradiating the receptor layer and backing layer with ultraviolet radiation while being heated to at least 180° F.

12. The imaging medium of claim 11, wherein the receptor layer comprises a blend of the first polymer in an amount of from 60 to 90% by weight and the second polymer in an amount of from 10 to 40% by weight.

* * * * *